United States Patent
Rosa Brusin et al.

(10) Patent No.: US 10,253,888 B2
(45) Date of Patent: Apr. 9, 2019

(54) FLOW-RATE DYNAMIC BALANCING CONTROL VALVE

(71) Applicant: GIACOMINI S.P.A., San Maurizio d'Opaglio (NO) (IT)

(72) Inventors: Marco Rosa Brusin, San Maurizio d'Opaglio (IT); Giacomo Alberganti, San Maurizio d'Opaglio (IT); Paolo Arrus, San Maurizio d'Opaglio (IT); Cesare Zoppis, San Maurizio d'Opaglio (IT); Roberto Torreggiani, San Maurizio d'Opaglio (IT)

(73) Assignee: GIACOMINI S.P.A., San Maurizio d'Opaglio (IT)

( * ) Notice: Subject to any disclaimer, the term of this patent is extended or adjusted under 35 U.S.C. 154(b) by 162 days.

(21) Appl. No.: 15/516,482

(22) PCT Filed: May 18, 2016

(86) PCT No.: PCT/IB2016/052899
§ 371 (c)(1),
(2) Date: Apr. 3, 2017

(87) PCT Pub. No.: WO2017/021789
PCT Pub. Date: Feb. 9, 2017

(65) Prior Publication Data
US 2018/0231132 A1 Aug. 16, 2018

(30) Foreign Application Priority Data
Aug. 5, 2015 (IT) .............................. UB2015A2864

(51) Int. Cl.
F16K 1/54 (2006.01)
F16K 1/52 (2006.01)
(Continued)

(52) U.S. Cl.
CPC .............. F16K 1/523 (2013.01); F16K 1/526 (2013.01); F24D 19/1015 (2013.01);
(Continued)

(58) Field of Classification Search
CPC .............................................. Y10T 137/86718
See application file for complete search history.

(56) References Cited

U.S. PATENT DOCUMENTS 2,777,464 A * 1/1957 Mosely ................. D06F 39/088
137/516.13
2,948,296 A * 8/1960 Thorburn ................ F16K 17/34
137/517
(Continued)

FOREIGN PATENT DOCUMENTS

CN 101825186 9/2010
CN 201 934 741 U 8/2011
(Continued)

OTHER PUBLICATIONS

International Search Report, dated Sep. 13, 2016, from corresponding PCT application.
(Continued)

Primary Examiner — John Fox
(74) Attorney, Agent, or Firm — Young & Thompson

(57) ABSTRACT

A flow control valve includes a valve body with inlet and outlet ports, and an intermediate chamber therebetween. The valve further includes a static flow rate regulator for the fluid, accessible from outside the valve body and adapted to vary the cross-section of a passage orifice between the inlet and the outlet of the valve. The valve further includes a dynamic flow rate balancer, regulating flow rate based on a change of the incoming flow rate. The flow rate balancer includes a perforated element interposed between the inlet port and the intermediate chamber, allowing fluid passage
(Continued)

only through at least one opening of the perforated element and an elastic element at one face of the perforated element facing the inlet port of the fluid into the valve body. An increase in the inlet/outlet differential pressure corresponds to an enlargement of the elastic element, guaranteeing a constant flow rate.

20 Claims, 7 Drawing Sheets

(51) Int. Cl.
    *F24D 19/10*     (2006.01)
    *G05D 7/01*     (2006.01)

(52) U.S. Cl.
    CPC ..... *G05D 7/012* (2013.01); *F24D 2220/0264* (2013.01); *Y10T 137/88062* (2015.04)

(56) References Cited

U.S. PATENT DOCUMENTS

| | | |
|---|---|---|
| 3,847,178 A | 11/1974 | Keppel |
| 5,580,029 A | 12/1996 | Bjerggaard |
| 6,695,011 B2 * | 2/2004 | Sochtig .................. G05D 7/012 |
| | | 137/516.15 |
| 9,777,857 B2 * | 10/2017 | Chen ..................... F16K 15/148 |
| 2014/0332097 A1 | 11/2014 | Twitchett |
| 2016/0054740 A1 * | 2/2016 | Essfeld ............... F24D 19/1015 |
| | | 137/500 |

FOREIGN PATENT DOCUMENTS

| | | |
|---|---|---|
| CN | 102788178 | 11/2012 |
| CN | 104235479 | 12/2014 |
| CN | 104747747 | 7/2015 |
| DE | 42 28 565 A1 | 3/1994 |
| EP | 2 226 697 A1 | 9/2010 |
| EP | 2 454 531 B1 | 8/2014 |
| EP | 2 818 960 A1 | 12/2014 |

OTHER PUBLICATIONS

Chinese Office Action for Application No. 201680003388.8, dated Dec. 25, 2018, with English translation provided.

* cited by examiner

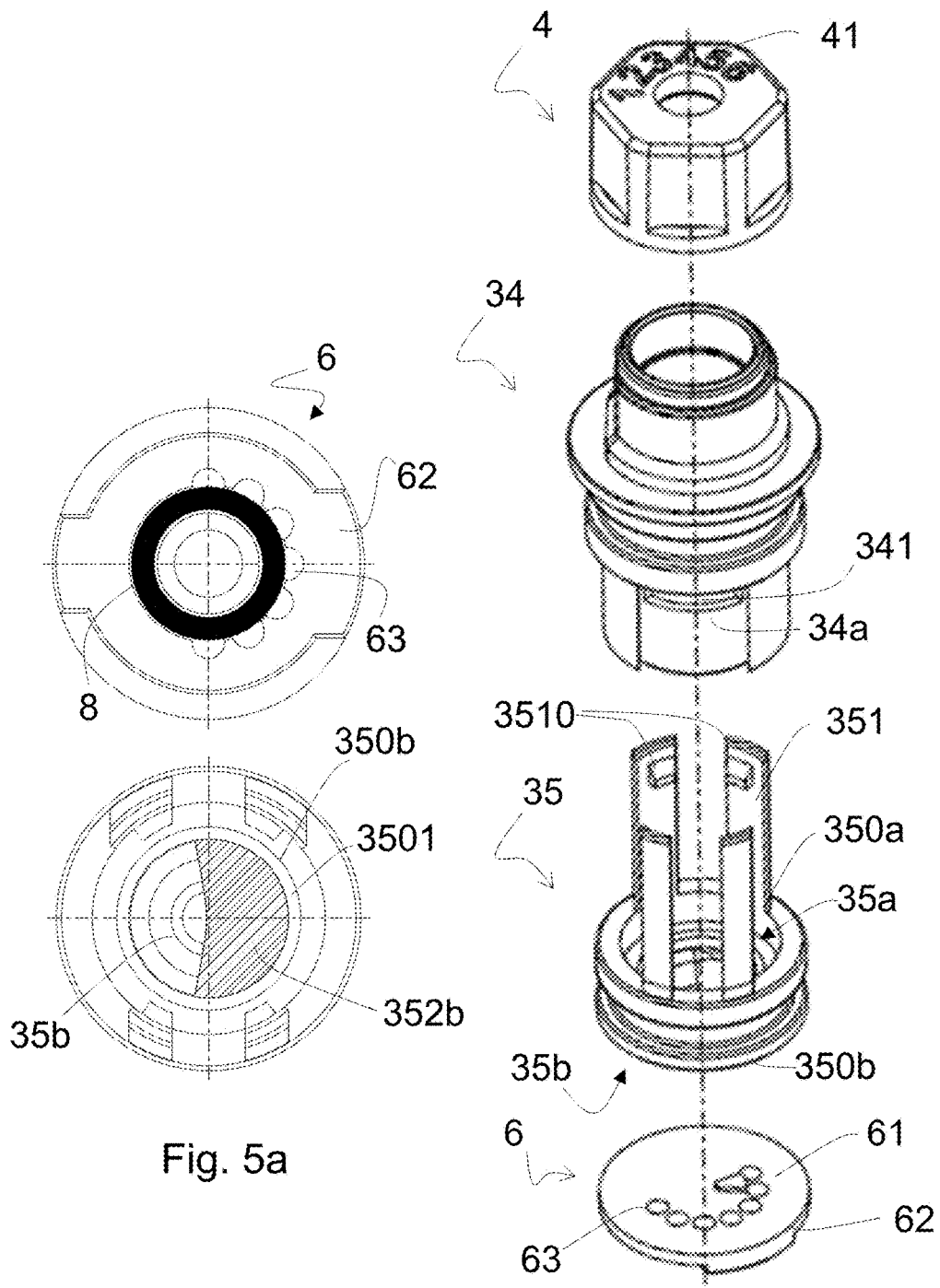

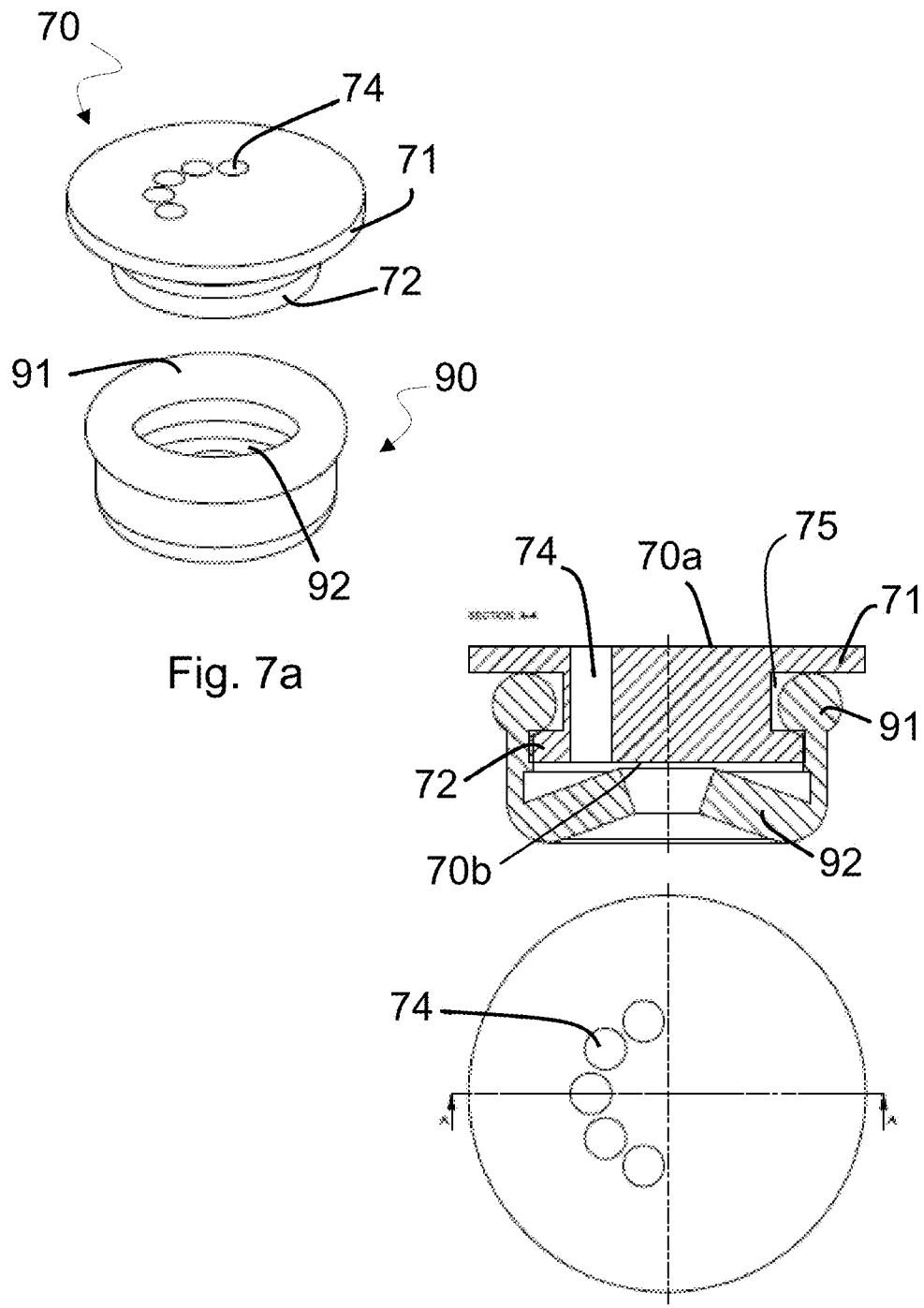

FLOW-RATE DYNAMIC BALANCING CONTROL VALVE

TECHNICAL FIELD

The present invention relates to the field of valves.

Particularly the invention relates to a valve controlling the flow rate of a fluid able to perform a static regulation and a dynamic balancing of the flow rate flowing therethrough according to the preamble of claim 1.

PRIOR ART

Valves controlling the flow rate of a fluid are usually used in fluid distribution systems. The regulation allows the fluid flow rate acting on the apparatuses of the system to be adjusted, and it is obtained, typically, by regulating the valve resulting in opening the fluid passage therein in a variable manner. Such opening action limits the maximum flow rate passing through the valve, provided that differential pressure conditions (that is system pressure conditions) do not change. Such type of regulation can be considered as being of the static type, namely not self-modulating with variable conditions of the system: the opening is pre-set and it does not dynamically self-adapt itself.

Over the years the evolution has led to solutions for the dynamic balancing of the flow rate of the fluid passing through the valve. Such solutions, typically, perform the dynamic balancing through a flow rate stabilization system essentially composed of a spring operating on a movable body, that by means of its movement generated by differential pressure changes, causes a variable opening for the fluid passage: the opening area for the fluid passage decreases as the differential pressure increases, generating the balance that stabilizes the flow rate. Examples of such solutions are known from the European patent EP2454531B1 and European patent application EP2818960A1.

However the valve described herein has a very complicated structure both as regards the number of components thereof and their assembling method, also due to the small dimensions of the components.

OBJECTS AND SUMMARY OF THE INVENTION

It is the object of the present invention to overcome the prior art drawbacks.

In particular it is the object of the present invention to provide a valve for controlling the flow rate of a fluid easy to be manufactured.

It is also an object of the present invention to provide a valve for controlling the flow rate of a fluid that is easy to be maintained.

These and other objects of the present invention are achieved by a flow control valve that embodies the characteristics of the annexed claims, which are an integral part of the present description.

The idea at the base of the present invention is to provide a valve for controlling the flow rate of a fluid comprising a valve body with an inlet port, an outlet port and an intermediate chamber placed between the two ports. The valve then comprises means for controlling the static flow rate of the fluid, accessible from the outside of the valve body, and intended to change the dimensions of a passage orifice placed between the inlet port and the outlet port of the valve. The valve further provides means for the dynamic balancing of the flow rate, intended to adjust the output flow rate from the valve as a function of a change in the differential pressure between the inlet and outlet of the valve. More in details, the flow rate dynamic balancing means comprise a perforated element, interposed between the inlet port and the intermediate chamber, to allow a fluid to pass only through at least one opening of the perforated element. The flow rate dynamic balancing means further comprise an elastic element, placed at one face of the perforated element facing the incoming direction of the fluid into the valve, such that to an increase in the differential pressure between inlet and outlet of the valve corresponds an enlargement of the elastic element along the face of the perforated element to cover a surface of the at least one opening depending on the increase in the differential pressure between inlet and outlet of the valve.

Such arrangement allows a flow control valve to be provided which achieves, in a simple constructional manner, a static regulation and a dynamic balancing of the flow rate. The particular arrangement of the deformable elastic element allows the use of springs to be reduced and accordingly it simplifies the architecture of the means moving the elements composing it.

The static regulation of the flow rate can take place in different manners.

In one embodiment the static regulating means comprise a movable control element inserted within the intermediate chamber and provided with a first passage opening intended to put in fluid communication the inlet port of the valve and the outlet port of the valve, said movable control element being movable with respect to the valve body such that in two different closing positions the first passage opening is in two different positions with respect to the outlet port such to determine a different size of the passage orifice.

In one embodiment, the first passage opening is shaped for at least one portion with a curvilinear profile with non-null derivative. This allows the static flow rate to be finely regulated.

Regardless of the shape of the passage opening, in one embodiment the movable control element further comprises a second passage opening intended to put in fluid communication the inlet port of the valve and the outlet port of the valve, the second passage opening having a size different from the first passage opening, the movable control element being movable to place the first passage opening or the second passage opening at the outlet port alternatively. Such arrangement allows discrete regulations of the flow rate to be obtained.

With reference again to flow rate dynamic balancing means, in one embodiment the perforated element comprises a plurality of through holes passing through the perforated element from the face facing the inlet port to a face facing the intermediate chamber. The movable control element further comprises a shutter shaped surface placed in contact with the face of the perforated element facing the intermediate chamber, the shutter surface and the perforated element being shaped such that to different rotations of the movable control element corresponds the closure of a different number of said holes. The geometric centers of the holes are preferably placed along a portion of circumference or along a portion of a spiral, and the shaped surface of the movable control element (35) is a circular sector, preferably greater than 180°.

Such arrangement allows the static flow rate of the valve to be regulated by acting on a simple rotation of the movable control element. The valve is thus easy to be manufactured from a structural perspective.

In one embodiment, instead of the holes, the perforated element comprises a slot-like opening that follows a spiral with the origin at the center of an annular seat where the element is housed. In particular in one embodiment the at least one opening of the perforated element is defined by an inner edge, an outer edge and connecting edges that connect the inner edge to the outer edge; the inner edge follows a portion of a circumference concentric to the annular seat, and the outer edge is a portion of a spiral with the origin in the center of the circumference on which the inner edge lies. Such arrangement is a valid alternative to holes and it allows the radial enlargement of the elastic element along the lower face of the perforated element to be used.

The elastic element is advantageously housed within an annular seat formed on a cylindrical body protruding from the face of the perforated element.

In one embodiment the elastic element is a circular section ring made of elastomeric material (O-ring) easy to be manufactured and available on the market.

In another embodiment, the perforated element is a cylindrical element, and the at least one opening passes through it from an upper face to a lower face. The perforated element is provided with a seat wherein the elastic element is housed, which is a membrane comprising at least one flap free to move in response to changes in differential pressure between the inlet and outlet of the valve, said flap extends towards the inside of said lower face and has a length such as to close said at least one opening when the differential pressure between inlet and outlet of the valve exceeds a preset value.

In one embodiment, the static regulating means for the flow rate further comprise movement means connected to a shutter. The movement means move the shutter into a plurality of operating position inside said intermediate chamber to change, and, at most, to stop, the fluid passage inside the intermediate chamber.

The provision of the shutter allows a further regulation of the static flow rate. Such shutter for instance can be controlled by a thermostatic head acting on the shutter movement means.

In one embodiment the movement means comprise a rod and a contrast spring intended to oppose a force acting on a free end of the rod. The static regulating means further comprise a control element accessible from the outside of the valve body, the control element being rigidly connected to the movable control element such that a rotation of the control element in each one of said closing positions corresponds to an equivalent rotation of the shutter surface that allows the fluid passage to be regulated through at least one opening of said perforated element, the control element being further freely rotatable around the rod such that its rotation does not affect the rod movement.

Advantageously then the control element, the perforated element and the elastic element are integrated within a cartridge provided with one end accessible from the outside of the valve body. Such arrangement allows a flow control valve to be manufactured that is easy to be maintained, since, in case of failure or damage of one component, by the possibility of removing the cartridge, it is possible to have the access to the element to be replaced more easily, without the need of working inside the valve body, with the risk of damaging it or additional components thereof. Further advantageous characteristics are the subject matter of the annexed claims that are an integral part of the present description.

BRIEF DESCRIPTION OF THE DRAWINGS

The present invention will be described below with reference to some not limitative embodiments, provided by way of example and not as a limitation in the annexed drawings. These drawings show different aspects and embodiments of the present invention and, where appropriate, like structures, components, materials and/or elements in different figures are denoted by like reference numerals.

FIGS. 5, 5a show an exploded view and a top and bottom view of a constructional detail of the valve of FIG. 1.

FIGS. 5b, 5c, 5d are variant embodiments of a constructional detail of FIG. 5a.

FIGS. 7a and 7c are an exploded view and a side sectional view and top view of a constructional detail of the valve of FIG. 6.

DETAILED DESCRIPTION OF THE INVENTION

Figure 1:
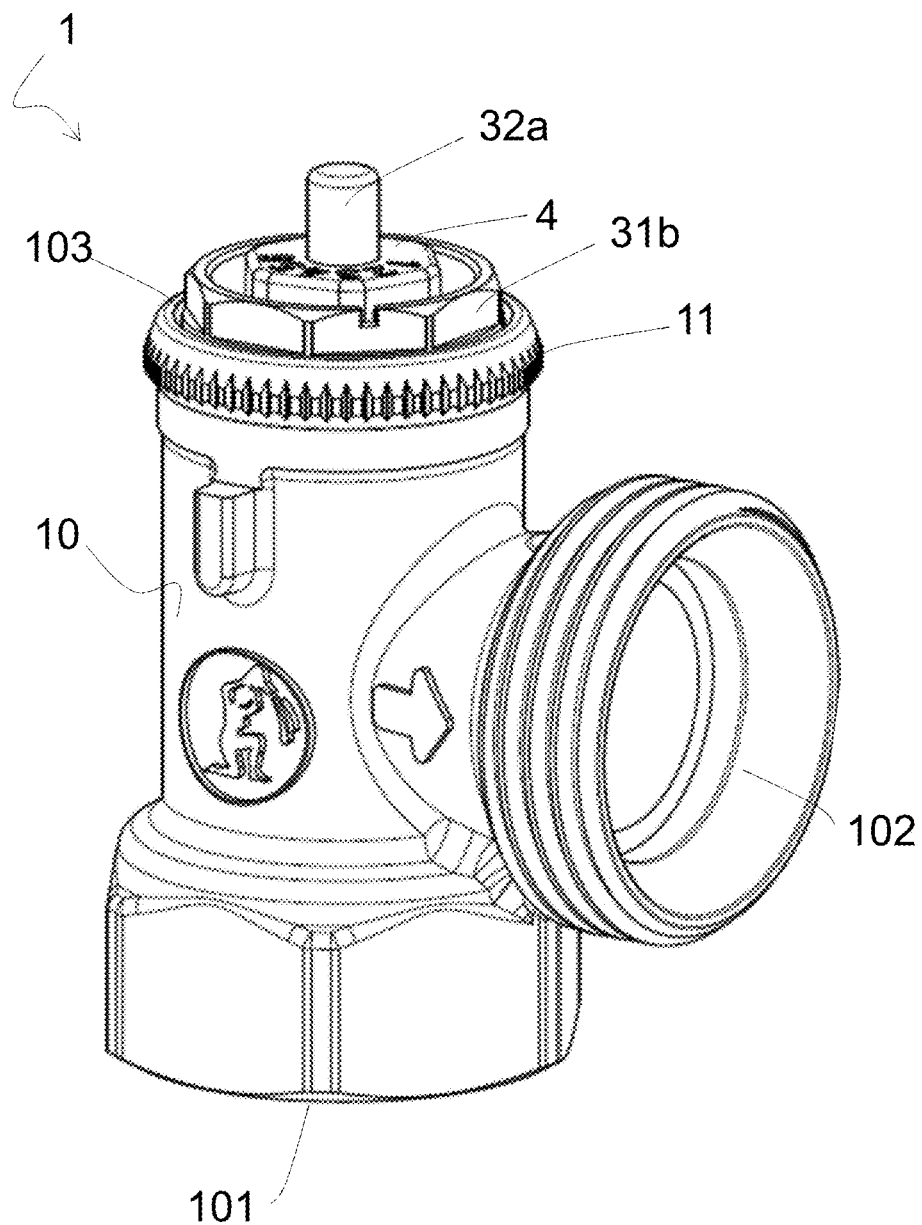
FIG. 1 is an overview of a flow control valve for a fluid according to the invention.

While the invention is susceptible of various modifications and alternative forms, some preferred embodiments are shown in the drawings and will be described below in details.

It should be understood, however, that there is no intention to limit the invention to the specific embodiment disclosed, but, on the contrary, the intention of the invention is to cover all modifications, alternative constructions and equivalents falling within the scope of the invention as defined in the claims.

The use of "for example", "etc", "or" indicates non-exclusive alternatives without limitation unless otherwise defined.

The use of "comprise" means "comprise, but not limited to," unless otherwise defined.

FIGS. 1-5 show a valve for the regulation and dynamic balancing of the flow rate of a fluid. Such valve is preferably used in distribution systems, such as for instance central systems, to regulate flow rate of a heat transfer fluid, for example to radiators (heating) or fan-coil units (heating and conditioning).

The valve 1 comprises a valve body 10 comprising three ports: the port 101 is an inlet port intended to receive the heat transfer fluid inside the valve body 10, the port 102 is an outlet port through which the heat transfer fluid is conveyed to a use circuit, while the port 103 is intended to receive a cartridge 30 for static flow rate regulation. The cartridge 30 is inserted through the port 103 in a hollow portion 20 of the valve body 10, developing aligned with the inlet port 101, thus the cartridge intercepts the heat transfer fluid within the valve and it regulates the flow rate thereof.

The cartridge 30 comprises an enclosure 31 housing the components necessary for the flow rate static regulation. The enclosure 31 comprises an outer surface provided with a thread 31a that allows the cartridge 30 to be fastened onto the inner threaded wall 22 of the hollow portion 20.

At the top the enclosure 31, on the end at the port 103, has a gripping profile 31b (octagon-shaped in the shown embodiment) external to the valve body 10, such that it is may be easy to remove it due to a possible maintenance or replacement of the components of the regulating cartridge.

The enclosure 31 further houses movement means that in the embodiment described herein comprise a rod 32 provided with an upper end 32a protruding outside the valve body 10 at the port 103.

The rod 32 is inserted in a spring 33; the spring 33 and the rod 32 are housed inside a cylindrical cavity of a spring holder 34, in turn housed inside the enclosure 31. The rod 32 passes through the spring holder 34 both the ends coming out therefrom. The spring at the bottom abuts on shoulders 34b projecting from a lower end 34a of the spring holder 34, and at the top from an intermediate enlarged section 32b of the rod 32. Thus the spring tends to urge the rod 32 in a direction opposite to the shoulders 34b.

The inner wall 31c of the enclosure 31 has a circumferential groove 310b forming a seat intended to house a retaining ring 311 for the spring holder, such as for example a metal wire or a Seeger ring, and a groove 310c intended to allow a form fit with an edge 340, protruding from the outer surface 34c of the spring holder 34. An anti-friction ring 312 is further interposed between the retaining ring 311 and the edge 340 of the spring holder 34.

The assembly of grooves 310b and 310c, retaining ring and edge 340 prevents the spring-holder 34 from moving along a direction parallel to the axis of the rod, while allowing it to rotate inside the enclosure 31.

Figures 3, 4:
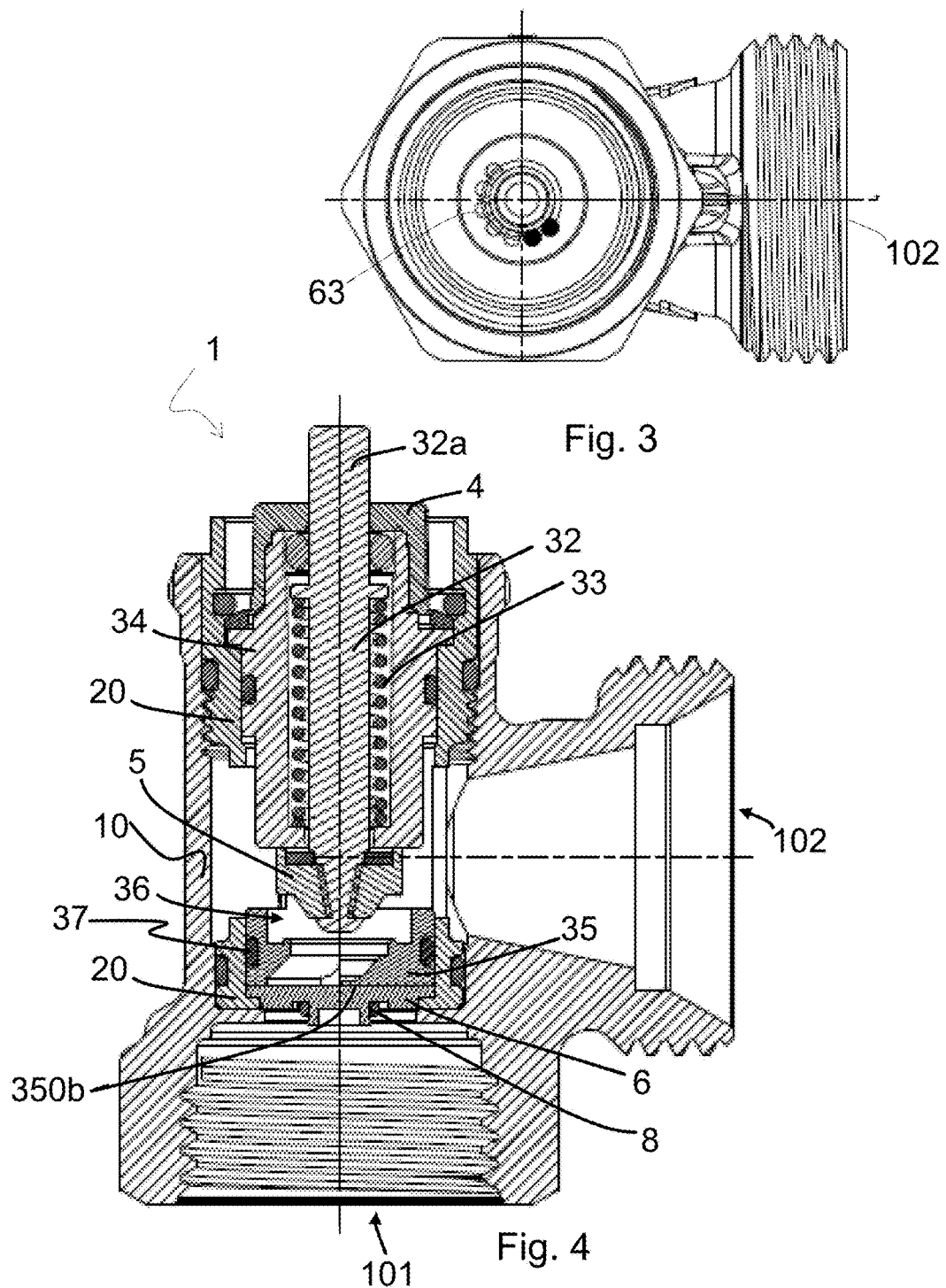
FIGS. 3 and 4 are a top view section and a side sectional view of the valve of FIG. 1.

As better seen in FIG. 4 and FIG. 5, at the lower end 34a of the spring holder 34 a substantially cylindrical shaped movable control element 35 is fastened which has an annular groove for receiving a gasket 37 necessary for guaranteeing the sealing effect with the inner walls of the enclosure 31.

The movable control element 35 is hollow inside and it comprises, at the end facing the spring holder 34, a first opening 35a delimited by a first edge 350a, and, at the opposite end, a second opening 35b obtained in the lower face 350b of the movable control element 35.

Four tabs 351 extend from the first edge 350a, which are spaced apart from each other and having a preferred development direction parallel to the axis of the rod 32, fastened to the lower end of the spring holder 34. The number of tabs is not essential for the invention.

Therefore the tabs 351 define openings through which the fluid, entering from the port 101, passes to go towards the port 102. The movable control element 35 and the spring holder 34 thus define an intermediate chamber 36 interposed between the port 101 and the port 102.

The movable control element 35 is fastened to the spring holder 34 by means of the tabs 351 and the fastening can be obtained for example by threading, welding or by a type of connection such as an elastic "snap". This is the type of fastening used in the example described herein, and it provides, on each free end (that is those distal to the edge 350a) of the tabs 351, a tooth 3510 shaped such to be fitted into a slot 341 of the spring holder 34. When the spring holder is mounted on the movable element 35, the tabs 351 open and each tooth 3510 fits into a respective slot 341 while connecting the two elements.

As visible in FIG. 5a, the lower face 350b has an annular edge 3501 inside which a shutter surface 352b is placed, that in one preferred embodiment of the invention, is a circular sector greater than 180°. Thus the opening 35b, is complementary to such circular sector.

The face 350b of the movable control element 35 is kept in contact with a perforated element 6 interposed between the inlet port 101 and the intermediate chamber 36, provided with at least one opening for the fluid passage. In details, in the mounted condition, the face 350b of the movable control element is placed in contact with the face 61 of the perforated element facing the intermediate chamber.

In the embodiment shown in FIGS. 2, 3, 4 and 5, 5a, the perforated element 6 has a plurality of through holes 63, having the same radius, and arranged along a semi-circumference with the center in the axis of development of the rod 32. Thus by rotating the shutter surface 352b with respect to the axis of development of the rod 32, it is possible to close a variable number of holes 63 thus allowing a static regulation of the incoming fluid flow rate.

Figure 5B:
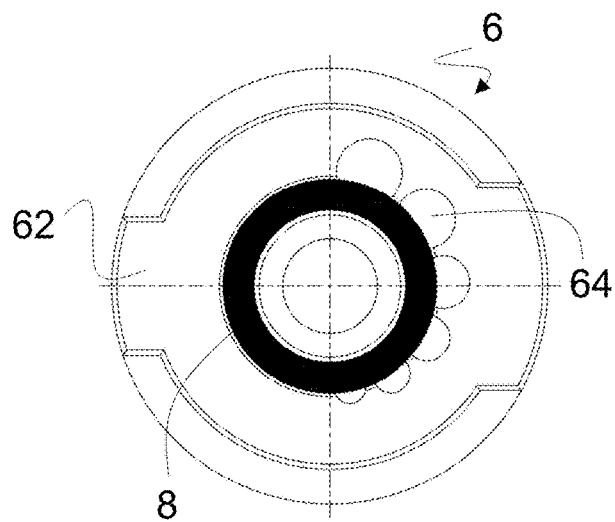

In a completely similar manner, other embodiments of the perforated element are possible in order to obtain a static regulation of the flow rate. For instance, such as shown in FIG. 5b, the perforated element 6 is provided with a plurality of circular holes 64 having a different radius, whose geometric centers are arranged along a portion of a spiral with the center in the axis of development of the rod 32.

Figure 5C:
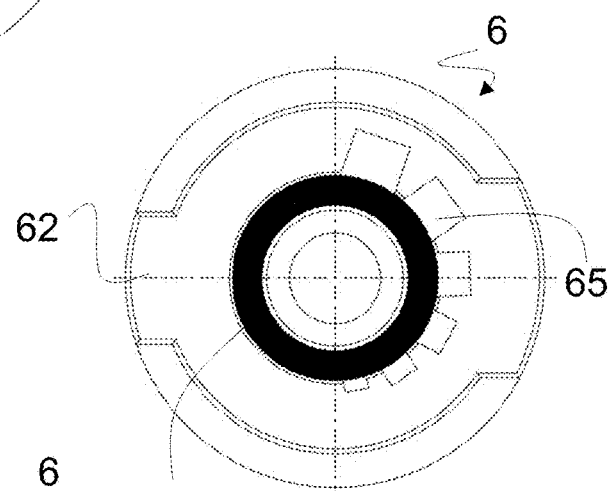

As an alternative the perforated element 6 can have polygonal-shaped openings 65 having the same or different size, whose geometric centers are arranged on a portion of a spiral, such as shown in FIG. 5c, or on a portion of a circumference (not shown in the figures) in both cases the portions having the center in the axis of development of the rod 32.

Figure 5D:
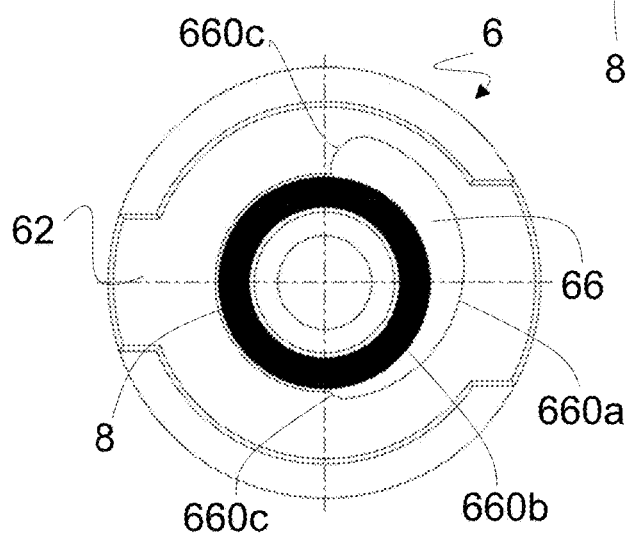

A further alternative is shown in FIG. 5d providing only one continuous, slot-like opening 66 obtained on the perforated element 6. In this variant the opening 66 is defined by an inner edge 660b and an outer edge 660a and by connecting edges 660c that connect the inner and outer edges.

In particular the inner edge follows a portion of a circumference concentric to a circumference having the center in the axis of development of the rod 32, while the outer edge 660a is a portion of a spiral with origin in the center of the circumference on which the inner edge 660b lies.

The rotation of the movable element 35 with respect to the perforated element 6 occurs by means of a control element 4 mounted on the upper end 32a of the rod 32. The control element 4 is rigidly fastened to the spring holder 34 and it can freely rotate about the axis of development of the rod 32 in a plurality of operating positions.

Therefore a rotation of the control element 4 corresponds to an equivalent rotation of the spring holder 34 inside the enclosure 31 of the cartridge 30 and, accordingly, an equivalent rotation of the control element 35.

In order to allow a simple regulation of the static flow rate, the control element 4 is provided with a regulation scale 41 identifying a plurality of closure positions corresponding to different flow rate values. Such as seen in FIG. 3 by rotating, for example, the control element 4 in position "3" an equivalent rotation of the spring holder 34 and also of the control element 35 is obtained. The shutter surface 352b rotates on the perforated element 6 and covers two holes (shown as filled circles in the figure).

Therefore the fluid is forced to flow in the remaining not covered through holes 63.

A further static regulation of the flow rate is obtained by a shutter 5 mounted on the lower end 32c of the rod 32.

Therefore the shutter 5 is placed at the intermediate chamber 36 and it can be moved inside it in a plurality of positions by control means (not visible in the figures) that are fitted on the free end of the rod 32. Such control means (for instance a thermostatic head or a screw manual closing system) apply a force in the direction of development of the rod, thus obtaining a linear motion of the rod, along the hollow portion 20, opposed by the spring 33 and proportional to the applied force.

In order to allow the control means to be coupled, the valve body 10 at the port 103 has a corrugated connection 11.

For example in one embodiment the control means can comprise a ring nut and a threaded cap that can be screwed thereon. The ring nut is fastened to the corrugated connection 11 and it keeps the cap in position above the rod 32. By screwing or unscrewing the cap on the ring nut, the force exerted on the rod 32 is adjusted and therefore the position of the shutter in the intermediate chamber 36 is regulated. Thus the volume of the intermediate chamber and therefore the flow rate of the valve are regulated.

In a further variant embodiment the ring nut on the contrary is integrated within the valve body 10. Upon lowering the shutter 5, till it occupies the opening 35a of the movable control element 35, the fluid communication between the inlet port 101 and the outlet port 102 of the valve body is stopped.

Figure 2:
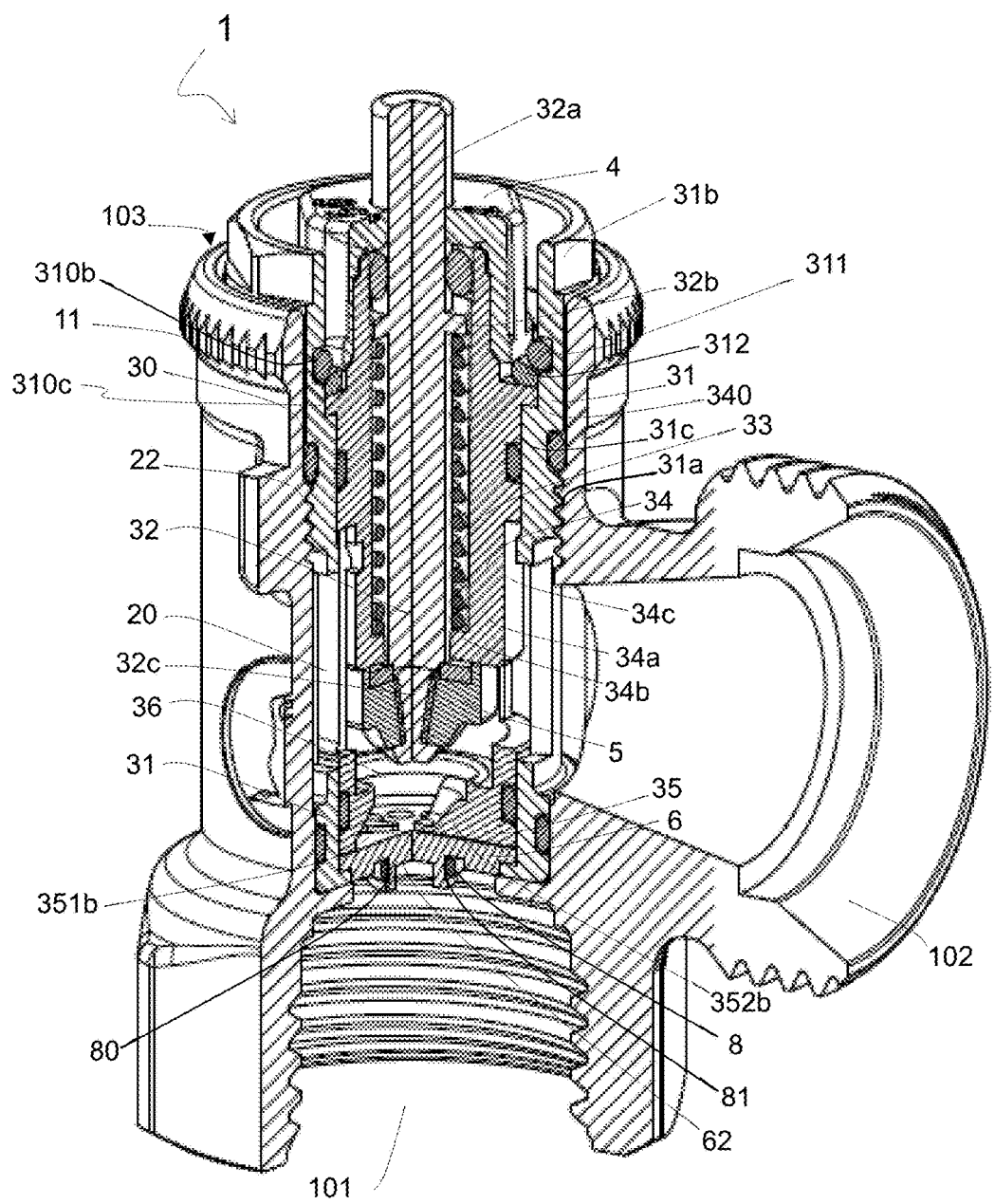
FIG. 2 is an axonometric broken view of the valve of FIG. 1.

On the contrary without a force applied on the rod 32, the shutter 5 is in a completely open position—therefore raised in the intermediate chamber 36 with respect to the opening 35a—and the fluid can flow between the inlet port 101 and outlet port 102 of the valve body 10. Such position is shown in FIG. 2 and FIG. 4.

In another embodiment an actuator able to move the rod 32 both in the opening direction and in the closing direction can be fitted on the free end of the rod 32, allowing the static regulation of the flow rate to be carried out without using the spring 33.

In order to obtain a dynamic balancing of the fluid flow rate—that is to maintain the fluid flow rate as constant, as set by the static regulating means described up to now, upon the change of the differential pressure between the inlet port 101 and the outlet port 102—on the face 62 of the perforated element 6, therefore the one facing the incoming direction of the fluid, an elastic element 8 is placed. In the shown embodiment, the elastic element is a circular section elastomeric ring (O-ring) but in a similar manner it is possible to provide elastomeric elements with polygonal profile sections or other geometries.

The elastic element 8 is mounted within an annular seat 81 of a neck 80 protruding from the center of the face 62 of the perforated element 6.

The neck 80 has a diameter smaller than that of the circumference where the through holes 63 are arranged, thus, with no fluid, the elastic element 8 is placed on the neck 80 preferably without interfering with the through holes 63

The elastic element 8, although being housed in the seat 81, has a surface exposed to the fluid passage and it is dimensioned such that the difference in pressure between inlet and outlet of the valve causes the elastic element to be pressed on the face 62: such pressing action reduces the area for the passage of the fluid through the through holes 63 such to guarantee the flow rate to be constant.

Under operating conditions, therefore, possible changes in the differential pressure between inlet and outlet of the valve deform to a greater or lower extent the elastic element that, therefore, will cover a variable surface of the through holes 63. This allows the output flow rate to be dynamically regulated.

Preferably the elastic element 8 is dimensioned and placed such that, at a threshold pressure difference value, it has a surface proximal to the holes 63, such that possible increases in the fluid differential pressure, with respect to the threshold value, generate a substantially immediate response of the valve, with the elastic element 8 closing the holes 63 in a manner proportional to the increase in the differential pressure.

From the above description it is clear how the flow control valve just described allows the provided objects to be achieved.

Therefore it is clear that the person skilled in the art of valves will be able to made different changes to the above examples, without for this reason departing from the scope of protection of the present invention, as it is defined in the annexed claims. For example the perforated element 6 can have dimensions different than the disc-like shape shown in the above example. The perforated element 6 may, for instance, have a cylindrical or prism shape and can anyway have through holes suitably arranged such to be obstructed by the static control element 35 and by the elastic element 8 that performs the dynamic balancing of the flow rate.

Likewise the movable control element 35 may have a shutter surface with a width different than that of the circular sector described above. The shutter surface for instance can be a circular sector with a size lower or equal to 180°.

In a further variant, in order to have a further static regulation of the flow rate, the movable control element 35 may have, instead of flaps 351, a surface where a continuous opening is formed, shaped with a curvilinear profile that for at least a portion has a non-null derivative.

To a rotation of the movable control element 35 with respect to the valve body 10 correspond different closing positions wherein the continuous opening is at the fluid outlet port 102, such to determine a different passage orifice for the fluid flowing from the inlet port 101 of the valve to the outlet port 102 of the valve.

As an alternative to the continuous opening, on the movable control element 35 it is possible to form a plurality of distinct openings, with different sizes, each one shaped for instance with a polygonal profile. In this case such openings are arranged such that by rotating the movable control element 35 a different opening of said plurality of openings is at the outlet port 102 and allows a different value of the fluid flow rate to pass through the outlet port 102.

Moreover although the elastic element 8 has been described as mounted into a seat 81 of a neck 80 protruding from the face 62 of the perforated element 6, however other arrangements to maintain in position such elastic element are possible.

Figure 6:
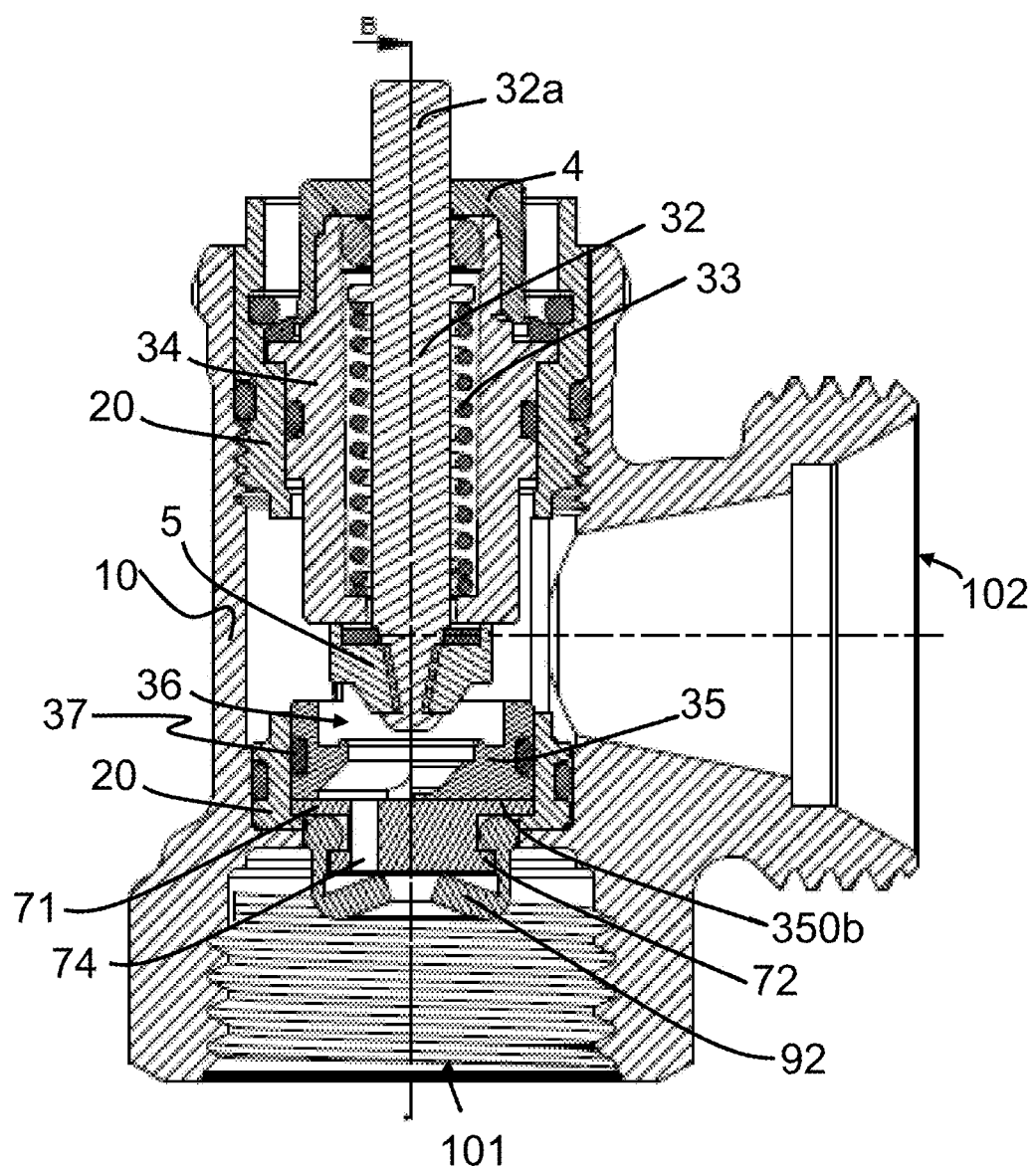
FIG. 6 is a side sectional view of a variant embodiment of the valve of FIG. 1.

For instance with reference to FIGS. 6, 7a and 7c, the perforated element is a cylindrical element 70, wherein a plurality of openings 74 are obtained passing therethrough from an upper face 70a thereof in contact with the shaped shutter surface 352b to a lower face 70b thereof facing the inlet port 101.

In the example described herein the openings are circular holes whose geometric centers are arranged on a portion of circumference but as an alternative thereto, the openings can have geometrical shapes and arrangements as described in examples of FIGS. 5b, 5c, 5d.

More in details the upper face 70a extends such to form a perimetral edge 71 of the cylindrical element 70 allowing it to be placed abutting on shoulders of the hollow body 20.

Also the lower face 70b extends forming a further perimetral edge 72 and thus the two edges define a seat 75 therebetween to house the elastic element.

In this embodiment, the elastic element is an elastomeric membrane 90, shaped as a ring, and provided with a first circular edge 91 housed in the seat 75 of the cylindrical element 70 and a flap 92 that, with the membrane 90 in the mounted condition, bends under the lower face 70b of the cylindrical element 70 and extends towards the inside of the lower face 70b towards near the openings 74.

When the flap 92 of the membrane is subjected to values of differential pressure between inlet and outlet of the valve exceeding the threshold one, it is urged immediately towards the openings 74 and it gets deformed while closing them in a manner proportional to the rise in different pressure, thus accomplishing a dynamic balancing of the flow rate.

In a further embodiment, the shutter 5 may be replaced by a different shutter for example a ball shutter. In this case the control means for the ball shutter would change, but the valve may by equally equipped with a movable control element, with a perforated element and with an elastic element coupled to one another as described above to obtain a static regulation and a dynamic balancing of the flow rate.

The invention claimed is:

1. Flow control valve (1) for a fluid, comprising
 a valve body (10) comprising an inlet port (101), an outlet port (102) and an intermediate chamber (36) placed between said inlet port (101) and said outlet port (102),
 means for regulating the static flow rate of the fluid, accessible from outside the valve body (10) and adapted to vary the size of a passage orifice located between the inlet port (101) and the outlet port (102) of the valve,
 means for the dynamic balancing of the flow rate adapted to regulate the flow rate of the fluid flowing out from said outlet port (102) as a function of changes in differential pressure between said inlet port (101) and said outlet port (102),
 wherein,
 the means for the dynamic balancing of the flow rate comprise
 a perforated element (6,70) interposed between the inlet port (101) and the intermediate chamber (36) to allow the fluid to pass only through at least one opening (63, 64, 65, 66, 74) of the perforated element (6,70),
 an elastic element (8,90) positioned at one face (62,73b) of the perforated element (6,70) facing towards the inlet port (101), such that an increase in the differential pressure between said inlet port (101) and said outlet port (102) corresponds to an enlargement of the elastic element (8,90) along the face (62,73b) of the perforated element (6,70) to cover a surface of the at least one opening depending on the increase of the differential pressure.

2. Valve (1) according to claim 1, wherein the means for regulating the static flow rate of the fluid comprise a movable control element (35) inserted inside the intermediate chamber (36) and provided with a first passage opening adapted to put in fluid communication the inlet port (101) of the valve and the outlet port (102) of the valve, said movable control element (35) being movable relative to the valve body (10) such that in two different closing positions the first passage opening is located in two different positions with respect to the outlet port (102) so as to determine a different size of the passage orifice.

3. Valve (1) according to claim 2, wherein the first passage opening comprises at least one edge with a curvilinear profile having a non-null derivative.

4. Valve (1) according to claim 3, wherein the movable control element (35) further comprises a second passage opening adapted to put in fluid communication the inlet port (101) of the valve and the outlet port (102) of the valve, the second passage opening being of a different size than the first passage opening, the movable control element (35) being movable to position alternately the first passage opening or the second opening at the outlet port (102).

5. Valve (1) according to claim 3, wherein the perforated element (6,70) comprises a plurality of through holes (63, 64, 65) that passes through the perforated element (6,70) from the face (62) facing the input port (101) to a face (61) facing the intermediate chamber (36), and wherein the movable control element (35) further comprises a shutter surface (352b) placed in contact with the face (61) of the perforated element (6,70) facing the intermediate chamber (36), the shutter surface and the perforated element being shaped such that different rotations of the movable control element (35) correspond to the closure of a different number of said holes.

6. Valve (1) according to claim 2, wherein the movable control element (35) further comprises a second passage opening adapted to put in fluid communication the inlet port (101) of the valve and the outlet port (102) of the valve, the second passage opening being of a different size than the first passage opening, the movable control element (35) being movable to position alternately the first passage opening or the second opening at the outlet port (102).

7. Valve (1) according to claim 2, wherein the perforated element (6,70) comprises a plurality of through holes (63, 64, 65) that passes through the perforated element (6,70) from the face (62) facing the input port (101) to a face (61) facing the intermediate chamber (36), and wherein the movable control element (35) further comprises a shutter surface (352b) placed in contact with the face (61) of the perforated element (6,70) facing the intermediate chamber (36), the shutter surface and the perforated element being shaped such that different rotations of the movable control element (35) correspond to the closure of a different number of said holes.

8. Valve (1) according to claim 7, wherein the geometric centers of the holes are disposed along a portion of circumference or along a portion of a spiral, and wherein the shutter surface (352b) of the movable control element (35) is a circular sector.

9. The valve of claim 8, wherein the shutter surface (352b) of the movable control element (35) is a circular sector, greater than 180°.

10. Valve (1) according to claim 2, wherein the means for regulating the static flow rate further comprise movement means (32) connected to a shutter (5), wherein said movement means (32) are adapted to move said shutter (5) in a plurality of operating positions within said intermediate chamber (36) to vary the passage of the fluid inside the intermediate chamber (36).

11. Valve (1) according to claim 10, wherein the movable control element comprises a hollow body which has a first opening (35a) at a first end, and a second opening (35b) at the opposite end adjacent to the shutter surface (352b), and wherein the plurality of operating positions of said shutter (5) comprises a fully closed position in which said shutter occupies the first opening (35a) of the movable control element (35) such that the passage of fluid between said inlet port (101) and said intermediate chamber (36) is stopped.

12. Valve (1) according to claim 11, wherein the moving means (32) comprise a rod (32) and a contrast spring (33) adapted to oppose a force acting on a free end of the rod (32), and wherein
 the means for regulating the static flow rate further comprise a control element (4) accessible from the outside of the valve body (10), the control element (4) being rigidly connected to the movable control element (35) such that to a rotation of the control element (4)

corresponds an equivalent rotation of the shutter surface (352*b*) which allows the passage of fluid to be regulated through the at least one opening (63, 64, 65, 66, 74) of said perforated element (6), the control element being further free to rotate around the rod (32) such that its rotation does not affect the movement of the rod (32).

13. Valve (1) according to claim 2, wherein the movable control element (35), the perforated element (6, 70) and the elastic element (8, 90) are housed inside a cartridge (30), wherein said cartridge has a gripping profile (31*b*) external to the valve body (10), such that the removal of the cartridge (30) from the valve body (10) is practicable.

14. Valve (1) according to claim 1, wherein the movable control element (35) further comprises a shutter surface (352*b*) placed in contact with a face (61) of the perforated element (6,70) facing the intermediate chamber, the shutter surface and the perforated element being shaped such that different rotations of the movable control element (35) corresponds to the closure of a different section of said at least one opening of the perforated element.

15. Valve (1) according to claim 14, wherein the elastic element (8) is housed in an annular seat formed on a cylindrical body (80) that protrudes from the face (62) of the holes (6), and wherein the at least one opening of the perforated element extends along a portion of a spiral with origin in the center of the annular seat, and wherein the shutter surface (352*b*) of the movable control element (35) is a circular sector.

16. The valve of claim 15, wherein the shutter surface (352*b*) of the movable control element (35) is a circular sector, greater than 180°.

17. Valve (1) according to claim 14, wherein the elastic element (8) is housed in an annular seat formed on a cylindrical body (80) that protrudes from the face (62) of the perforated element (6), and wherein the at least one opening of the perforated element is defined by an inner edge, an outer edge and connection edges which connect the inner edge to the outer edge, wherein the inner edge follows a portion of circumference concentric to the annular seat, and wherein the outer edge is a portion of a spiral with origin in the center of the circumference on which the inner edge lies.

18. Valve (1) according to claim 1, wherein the elastic element (8) is housed in an annular seat formed on a cylindrical body (80) that protrudes from the face (62) of the perforated element (6) facing the inlet port (101).

19. Valve (1) according to claim 18, wherein said elastic element (8) is a ring made of elastomeric material with a circular section.

20. Valve (1) according to claim 19, wherein the perforated element is a cylindrical element (70), wherein the at least one opening pass through said perforated element from an upper face (70*a*) to a lower face (70*b*), wherein the perforated element is provided with a seat (75) housing the elastic element (90), wherein the elastic element is a membrane comprising at least one flap free to move in response to changes in differential pressure between the inlet and outlet of the valve, said flap extends towards the inside of said lower face (70*b*) and has such a length to proportionally close said at least one opening when the differential pressure between inlet and outlet exceeds a preset differential pressure value.

* * * * *